United States Patent Office 3,793,256
Patented Feb. 19, 1974

3,793,256
CONTROLLED CURING PF POLY(ARYLENE
SULFIDE) RESINS
Jack S. Scoggin, Bartlesville, Okla., assignor to
Phillips Petroleum Company
No Drawing. Filed Aug. 30, 1972, Ser. No. 284,703
Int. Cl. C08g 23/00
U.S. Cl. 260—79    10 Claims

ABSTRACT OF THE DISCLOSURE

The molecular weight of poly(arylene sulfide) resins can be increased by heat treatment under oxidizing atmosphere at an elevated temperature below the melting point of the resin. This curing reaction can be terminated by flushing out the oxidizing atmosphere with an inert gas, such as steam, and then cooling the resin in the presence of the inert gas to a temperature at which no significant curing would be accomplished in an oxidizing atmosphere. The cooling of the resin can then be completed in the presence of air.

---

This invention relates to a process for producing aromatic sulfide polymers having improved processing characteristics. In a specific aspect, the invention relates to a controlled curing of poly(arylene sulfide) resins.

Aromatic sulfide polymers ranging in consistency from viscous liquids to crystalline solids are known. While such polymers exhibit desirable properties for many applications, such as molding compositions, the unmodified polymers normally possess a relatively high melt flow, e.g., above 4000, which inhibits their use in many applications. For example, when exposed to process temperatures above their melt point, the unmodified polymers tend to surface pre-cure only and require extensive processing times or special apparatus for thin film processing. The very low melt viscosity of the unmodified polymers makes it difficult to handle the unmodified polymers by conventional molding practices. Since the desirable properties make the polymers extremely useful, it would be advantageous to improve the processability of the solid polymers without materially affecting the desirable properties. One technique for achieving the improvement in processability is to pre-cure the virgin poly(arylene sulfide) resin by contacting the resin, preferably in particulate form, with an oxidizing atmosphere at a temperature below the melting point of the resin. This pre-curing process can be employed under suitable time and temperature conditions to produce the desired melt flow characteristics. However, difficulty has been encountered in stopping the curing reaction at the desired level. In addition, it would be desirable to minimize, if not eliminate, the variations in curing levels throughout the body of the resin due to variations in the rate at which the resin particles are cooled at the conclusion of the curing operation.

In accordance with the present invention, it has now been discovered that the curing level achieved by exposing the resin to an oxidizing atmosphere at an elevated temperature below the melting point of the resin can be accurately terminated by flushing out the oxidizing atmosphere with an inert fluid and then cooling the resin in the presence of the inert fluid to a temperature at which no significant curing would be accomplished in an oxidizing atmosphere. If desired, the cooling of the resin can then be completed in the presence of air.

Accordingly, it is an object of the present invention to provide a process for improving the processing characteristics of poly(arylene sulfide) resins. Another object of the invention is to provide an improved process for increasing the molecular weight of poly(arylene sulfide) resins. It is an object of this invention to provide an improved process for controlling the curing level of poly(arylene sulfide) resins. Another object of the invention is to improve the uniformity of curing of poly(arylene sulfide) resins. A further object of the invention is to provide an improved process for producing arylene sulfide polymers having desired melt flow properties. Other objects, aspects and advantages of the invention will be apparent to those skilled in the art upon reading the specification and the appended claims.

The invention is broadly applicable to poly(arylene sulfides) formed by any known technique. It can be used, for example, with the resins manufactured as described in U.S. Pat. 2,513,188, prepared by reacting mixtures of p-dichlorobenzene and 1,2,4-trichlorobenzene with sulfur and a metal halide at fusion temperatures. It can also be used with the resins manufactured by the method described in British Pat. 962,941, wherein metal salts of halothiophenols are heated at a polymerizing temperature. The invention is especially useful with polymers prepared as described by James T. Edmonds, Jr. and Harold Wayne Hill, Jr. in U.S. Pat. 3,354,129, issued Nov. 21, 1967. As disclosed in the Edmonds et al. patent, these polymers can be prepared by reacting a polyhalo-substituted cyclic compound containing unsaturation between adjacent ring atoms and an alkali metal sulfide in a polar organic compound. The resulting polymer contains a cyclic structure of the polyhalo-substituted compound coupled in repeating units through a sulfur atom. The polymers which are preferred for use in this invention, because of their high thermal stability and availability of the materials from which they are prepared, are those polymers having the repeating units —R—S— wherein R is phenylene, biphenylene, naphthalene, biphenylene ether, or a lower alkyl-substituted derivative thereof. The term "lower alkyl" is used herein to mean alkyl groups having 1 to 6 carbon atoms, such as methyl, propyl, isobutyl, n-hexyl, and the like.

Polymers which are generally preferred are those which have melting temperatures above about 200° C. These arylene sulfide polymers can have a melting temperature anywhere in the range of about 200° C. to about 500° C. Polymers of phenylene sulfide normally have melting temperatures in the range from about 290° C. to about 480° C. The preferred polymers have an inherent viscosity in 1-chloronaphthalene at 206° C. (modified ASTM Method D–1243–60) of at least 0.1, more preferably between 0.1 and 0.3, and ideally between 0.13 and 0.23.

It has been found that an improved poly(arylene sulfide) resin can be obtained by heating the virgin poly(arylene sulfide) resin in particulate form in the presence of an oxygen-containing gaseous oxidizing atmosphere at a temperature below the melting point of the resin for a time sufficient to effect a desired reduction in the melt flow of the resin. The thus modified polymer is a stable resinous material which retains its original physical appearance, e.g., particulate shape, and also remains sufficiently thermoplastic to be formed into shaped articles as by injection or compression molding with substantially reduced processing times. It is understood that the properties of the modified polymeric material will vary depending upon the nature of the virgin polymer and the length of time and the temperature of the heat treatment and the level of contact with the oxidizing agent.

In accordance with the invention, the polymer is heated in the presence of an oxygen-containing gaseous oxidizing medium to a temperature which is below the melting point of the chosen polymeric product for a period of time sufficient to effect cure and reduce the melt flow. The melting point of arylene sulfide polymers can be readily determined by differential thermal analysis (DTA) by heating a 10 mg. sample of the polymer at a rate of 10° C. per minute. The melting point is taken from the DTA thermogram in a conventional manner. The temperature will vary within the range of about 200° F. to about 1000° F. depending upon the molecular weight and nature of the polymeric product being treated. Generally, the treatment temperature will be in the range of from about 10 to about 70 centigrade degrees, preferably from about 25 to about 55 centigrade degrees, below the melting point of the polymer being treated. The time during which the mixture is held at such a temperature will be sufficient to effect pre-cure and reduce the melt flow, and ordinarily will range from about 10 minutes to about three days, usually from about 2 to 12 hours, with the longer times being used at lower temperatures and vice versa, depending specifically on the type of polymer being processed. The preferred time for a polyphenylene sulfide resin, for example is 2 to 8 hours at a temperature ranging from about 25 to about 55 centigrade degrees below the melting point of the polymer.

As indicated above, the heating is carried out in the presence of an oxygen-containing gaseous oxidizing atmosphere such as oxygen, a mixture of nitrogen and oxygen, or preferably, air. The oxidizing gas rate with respect to contacting of the particulate resin will vary appreciably, depending upon the type of apparatus employed for carrying out the oxidative curing. The heating according to the invention can be carried out in conventional equipment. In a presently preferred embodiment the virgin poly(arylene sulfide) resin in the form of a body of heated solid particulate particles is pre-cured by passing preheated air through the interstices.

In accordance with the present invention, when the desired level of pre-cure is achieved, the passage of oxidizing gas through the body of solid particles of poly(arylene sulfide) resin is terminated, and the residue of oxidizing gas is purged from the body by the passage therethrough of an inert gaseous medium, for example, steam, nitrogen, carbon dioxide, and the like, or mixtures thereof. The purging will generally be completed in from 1 minute to 30 minutes, preferably in from 1 to 10 minutes, and more preferably in less than 5 minutes. The body of pre-cured particles of poly(arylene sulfide) resin is then cooled in the presence of the inert gaseous medium and in the at least substantial absence of the oxidizing gas at least down to a temperature at which no significant amount of further curing would occur in the presence of the oxidizing gas. The cooling can be achieved by any suitable means, but in a presently preferred embodiment the cooling is accomplished by heat flow from the particles through the vessel wall to a cooling medium and the passage through the interstices of the body of a cool stream of the inert medium. After the temperature of the solid particle has been lowered to the temperature at which no significant further pre-curing will take place in the presence of the oxidizing medium, further cooling of the particles to atmospheric temperature can be achieved by any suitable means, preferably by contact with a flowing stream of air at atmospheric temperature.

The following example is presented in further illustration of the invention, but should not be construed in undue limitation thereof.

EXAMPLE 3000 pounds of virgin polyphenylene sulfide, inherent viscosity of 0.12–0.20, is heated in particulate form in contact with about 75 to about 8000 cubic feet of air, to a temperature of 220° to 375° C. The degree of polymer curing is determined periodically by measuring the melt flow of a sample of the cured polymer by ASTM Method–1238–70, Condition F. The heating of the polymer air mixture can be accomplished in an oven, by the use of a jacketed agitated vessel, or in a fluidized bed.

After a melt flow test indicates the polymer has reached the desired degree of curing, cooling of the polymer is started and air is displaced from the polymer by the passage of steam through the body of particles. Essentially all of the air is displaced in a period of 1 to 10 minutes, thus stopping the curing reaction. The polymer is then cooled to a temperature in the range of 150° to 200° C. in the presence of steam. After the temperature of the polymer is reduced to 150° to 200° C., the polymer can again be contacted with air, since the curing reaction rate approaches zero at 200° C. The polymer can be cooled from 200° C. to about 65° C. in pneumatic transport lines. Nitrogen or $CO_2$ can be used instead of steam.

Reasonable variations and modifications are possible within the scope of the foregoing disclosure and the appended claims to the invention.

I claim:

1. A process for the controlled pre-curing of a poly(arylene sulfide) resin which comprises heating said resin in the form of solid particles in the presence of an oxygen-containing gaseous oxidizing atmosphere to a temperature in the range of about 10 to about 70 centigrade degrees below the melt point of said resin for a time sufficient to effect the desired level of pre-cure, purging said solid particles with an inert fluid to free said solid particles of said oxidizing atmosphere, and cooling said solid particles in the presence of said inert fluid and in the at least substantial absence of said oxidizing atmosphere to a temperature at which no significant amount of further curing of said solid particles would occur in the presence of said oxidizing atmosphere.

2. A process in accordance with claim 1, further comprising contacting the thus cooled solid particles with relatively cool air to further reduce the temperature of said solid particles.

3. A process in accordance with claim 1 wherein said oxidizing atmosphere is air.

4. A process in accordance with claim 1 wherein said inert fluid is steam.

5. A process in accordance with claim 1 wherein said temperature to which said solid particles are heated is in the range of about 25 to about 55 centigrade degrees below the melt point of said resin.

6. A process in accordance with claim 1 wherein said resin comprises —R—S— repeating units wherein R is phenylene, biphenylene, naphthalene, biphenylene ether, or a lower alkyl derivative thereof.

7. A process in accordance with claim 1 wherein said resin comprises polyphenylene sulfide.

8. A process in accordance with claim 7 wherein said oxidizing atmosphere is air.

9. A process in accordance with claim 7, further comprising contacting the thus cooled solid particles with relatively cool air to further reduce the temperature of said solid particles.

10. A process in accordance with claim 9 wherein said inert fluid is steam.

References Cited

UNITED STATES PATENTS

| | | | |
|---|---|---|---|
| 3,524,835 | 8/1970 | Edmonds, Jr., et al. | 260—79.1 |
| 3,562,199 | 2/1971 | Hill, Jr. et al. | 260—37 R |
| 3,699,087 | 10/1972 | Wood et al. | 260—79 |

DONALD E. CZAJA, Primary Examiner

M. I. MARQUIS, Assistant Examiner

U.S. Cl. X.R.

260—47 R, 79.1